United States Patent [19]

Douglas et al.

[11] Patent Number: 4,521,381
[45] Date of Patent: Jun. 4, 1985

[54] RECOVERY OF RHENIUM

[75] Inventors: Alan D. Douglas; Kenneth T. Reilly, both of Towanda, Pa.

[73] Assignee: GTE Products Corporation, Stamford, Conn.

[21] Appl. No.: 669,126

[22] Filed: Nov. 7, 1984

[51] Int. Cl.³ .............................................. C01G 47/00
[52] U.S. Cl. ...................................... 423/49; 423/53; 423/54; 75/101 BE
[58] Field of Search ................ 423/49, 54; 75/101 BE

[56] References Cited

U.S. PATENT DOCUMENTS

| 2,187,750 | 1/1940 | Maruin | 423/53 |
| 2,945,743 | 7/1960 | Zimmerley et al. | 423/54 |
| 3,672,874 | 6/1972 | Wiley | 75/101 BE |
| 3,932,579 | 1/1976 | Morgan | 75/101 BE |
| 4,278,641 | 7/1981 | Petrov et al. | 75/101 BE |

FOREIGN PATENT DOCUMENTS

| 16249 | 5/1971 | Japan | 75/101 BE |
| 163359 | 1/1963 | U.S.S.R. | 423/49 |

*Primary Examiner*—H. T. Carter
*Attorney, Agent, or Firm*—Robert E. Walter

[57] ABSTRACT

In a process is disclosed for recovering rhenium from tungsten and rhenium bearing material by oxidizing and fusing the starting material, solubilizing the tungsten and rhenium values, passing the resulting solution through a strongly basic anion exchange resin to retain the rhenium, removing the rhenium from the resin with an organic stripping liquid of tributylphosphate and hydrochloric acid, washing the remaining rhenium off the resin with water, combining the water and organic to form a two phase system in which the organic phase contains the major portion of the rhenium, and contacting with aqueous ammonia to strip values.

4 Claims, No Drawings

RECOVERY OF RHENIUM

FIELD OF THE INVENTION

This invention relates to a process for recovering rhenium from tungsten and rhenium bearing material.

BACKGROUND OF THE INVENTION

A previous method for recovering rhenium from material containing tungsten and rhenium such as scrap wire involves heating the scrap in air to a temperature at which both tungsten and rhenium are oxidized. Rhenium heptoxide, being volatile, sublimes from the tungsten oxide and is collected in a cooler portion of the furnace system. The rhenium is then recovered by dissolution in water to form soluble perrhenic acid which can be processed chemically to other desired rhenium compounds.

A disadvantage of this method is a low recovery efficiency of contained rhenium. Substantial amounts of rhenium remain with the tungsten. Another disadvantage is the need for a capital investment in a furnace to carry out the oxidizing, subliming, and condensing steps.

SUMMARY OF THE INVENTION

In U.S. patent application Ser. No. 669,125, a fused and oxidized mixture containing rhenium values is dissolved in water to form a feed solution. An anion exchange resin is used to remove rhenium from the feed solution. The contents of this application is unimportant by reference into the present application. The rhenium is then stripped from the resin with an acid, preferably a mineral acid. There are some potential safety hazards with certain mineral acids as perchloric acid and nitric acid. Since stripping solutions of mineral acids are generally dilute with respect to dissolved rhenium values, for large volumes are generally required to strip the rhenium. The present invention is an improvement. By using an organic stripping liquid, higher concentrations of rhenium values can be obtained in the stripping liquid.

In accordance with the present invention, there is provided a process for recovering rhenium from tungsten and rhenium starting material which involves reacting the starting material with a mixture of sodium hydroxide and an oxidizing reactant to form a fused solid, dissolving the fused solid in water to form a solution comprising tungsten and rhenium values, contacting the solution comprising tungsten and rhenium values with a bed of a strongly basic anion exchange resin to absorb a major portion of the rhenium values and to form a rhenium depleted solution containing the resin bed with an organic stripping liquid comprising tributylphosphate and hydrochloric acid with the resin to form a first liquid comprising rhenium values contacting water with the resin to form a second liquid of rhenium values, mixing the first and second liquid to form a combined solution, forming a two phase system consisting of an organic phase of tributyl phosphate and the major portion of the rhenium and an aqueous phase comprising hydrochloric acid, water, and the minor portion of the rhenium, separating said organic phase from said aqueous phase, removing the major portion of the hydrochloric acid from said aqueous phase to form a solution of perrhenic acid, mixing said organic phase with aqueous ammonia to transfer essentially all the rhenium values from said organic phase and form another two phase system consisting of another organic phase of tributyl phosphate and another aqueous phase comprising aqueous ammonia and essentially all of rhenium, and separating the other aqueous phase from the other organic phase.

DETAILED DESCRIPTION OF THE INVENTION

The preferred source or starting materials are tungsten-rhenium scrap wire, powder, or chunks with typical ranges of rhenium of from about 1 percent to about 10 percent with from about 3 percent to about 10 percent by weight being preferred. The balance is essentially all tungsten.

The starting material is reacted with sodium hydroxide and an oxidizing reactant which is preferably sodium nitrate, sodium nitrite, sodium chlorate, or sodium peroxide to form a fused solid. The process of reacting the material by this oxidizing fusion is described in U.S. patent application Ser. No. 669,125, filed concurrently herewith, which is incorporated by reference.

The resulting fused material contains essentially all of the tungsten and rhenium in oxidized form as sodium tungstate and sodium perrhenate. Next the fused material is dissolved in water, preferably hot water to solubilize the tungsten and rhenium values. Insolubles may be removed by any standard technique such as filtration.

The resulting solution is then passed through a bed of a strongly basic anion exchange resin. The preferred resin is a styrene divinylbenzene copolymer lattice with a relatively high degree of cross-linking to which is attached quaternary ammonium exchange groups. The quaternary ammonium exchange groups contain an exchangeable anion usually chloride; but the anion can be also hydroxide, nitrate, sulfate, and the like. A preferred resin is supplied by Illinois Water Treatment Company under the name of IWT A 284. Another similar satisfactory resin is supplied by Dow Chemical Company under the name of Dowex 1-X8. The exchangeable anion of the resin is replaced by the anion of the solution passing through the resin bed, in this case by the perrhenate ion of the tungsten and rhenium bearing alkaline solution. The exchange capacity of strongly basic anion exchange resins of the type described above is generally from about 1.0 to about 1.4 milliequivalents of the anion per milliliter or resin. In the case of the perrhenate anion, the capacity is from about 0.183 to about 0.257 grams of rhenium per milliliter of resin. The perrhenate anion is selectively exchanged over the tungstate anion under the solution conditions of very high pH and herein lies the basis for the tungsten-rhenium separation. The tungsten values pass through the resin. The resulting solution or raffinate contains essentially all of the tungsten values and can be processed by conventional methods to recover the tungsten. The rhenium concentration in the raffinate is generally about 0.01 grams per liter. Generally from about 90 percent to about 100 percent and more typically from about 99 percent to about 99.95 percent of the rhenium is removed from the starting solution and retained on the resin. The resin can be washed with deionized water to remove any residual impurities without removing any rhenium.

The organic stripping liquid preferably comprises from about 4.5% to about 35% by volume of hydrochloric acid with from about 17% to about 25% being preferred and the balance tributyl phosphate. The hydrochloric acid used is preferably reagent grade and in concentrated form, that is about 37% by weight. The tributylphosphate and hydrochloric acid are mixed vigorously and the mixture is allowed to stand for a period of time sufficient to allow any aqueous phase to settle out. Generally about one half hour is sufficient. Any aqueous is then removed from the bottom of the container. The stripping solution is then passed through the resin to remove the rhenium values and to form a first solution of the rhenium dissolved in the tributylphosphate. Essentially what happens is that the chloride anion of the hydrochloric acid exchanges with the perrhenate anion on the resin and the rhenium is stripped off the resin, forms perrhenic acid in the acid environment provided by the hydrochloric acid, and the perrhenic acid dissolves in the tributyl phosphate. The rhenium content in the tributyl phosphate may be relatively high. A typical content is about 30 grams of rhenium per liter.

Water is next passed through the resin to form a second solution of rhenium values which can contain hydrochloric acid and some tributyl phosphate. The first and second solutions are then combined and mixed and allowed to settle to form a first two phase system consisting of a first organic phase made up essentially of tributyl phosphate and the major portion of the rhenium and a first aqueous phase made up essentially of hydrochloric acid, water, and a minor portion of the rhenium.

The first aqueous phase is then removed from the first organic phase, usually by withdrawing the aqueous phase from the bottom of a separatory container after the phases have had sufficient time to separate.

A major portion of the hydrochloric acid is then removed from the first aqueous phase, typically by evaporation. The resulting solution is essentially perrhenic acid.

The first organic phase is contacted with aqueous ammonia (or ammonium hydroxide) to form a second two phase system consisting of a second organic phase which is now essentially tributyl phosphate and a second aqueous phase which is made up essentially of aqueous ammonia (or ammonium hydroxide) and essentially all of the contained rhenium. The volume of aqueous ammonia used is typically about twice that of the organic. The mixture is allowed to stand for about one half hour for the phases to separate. The second aqueous phase is then removed from the second organic phase.

The tributyl phosphate organic can be reused in the process.

The second aqueous phase can be combined with the perrhenic acid solution to form ammonium perrhenate which can be crystallized a number of times by standard techniques to obtain a pure product. Alternately ammonium perrhenate can be crystallized from the second aqueous phase per se.

EXAMPLE

A 6 inch diameter column is charged with about 34 pounds of Illinois Water Treatment Company resin IWT A-284. After suspension in water the resin settles to a volume of about 6 gallons. The excess water is drained out of the resin and about 195 gallons of alkaline solution containing about 162.5 pounds of tungsten value and about 5.70 pounds of rhenium values is passed through the resin. The solution containing the rhenium and tungsten values was prepared according to the Example set forth in U.S. patent application Ser. No. 669,125. About 12 gallons of water is then passed throught the resin to rinse out any impurities. The stripping solution is prepared by mixing about 25 gallons of tributyl phosphate and about 6.88 gallons of reagent grade hydrochloric acid (37%). This stripping solution is passed through the resin to strip off the rhenium. Water is then passed through the resin as a backwash to remove any tributyl phosphate and hydrochloric acid from the resin. About 25 gallons of water is used. The strip solution containing the major portion of the rhenium is combined with the water wash with thorough mixing, to form a two phase system. The two phases are allowed to settle and separate. The aqueous layer is withdrawn from the bottom of the tank and is set aside. This aqueous portion contains rhenium as perrhenic acid which can be subsequently recovered by standard methods. About 28 gallons of ammonium hydroxide are added to the organic phase which contains tributyl phosphate and the major portion of the rhenium. The ammonium hydroxide-tributyl phosphate-rhenium mixture is agitated for about 15 minutes to thoroughly mix and contact the phases. After settling, the aqueous phase containing ammonium perrhenate and ammonium hydroxide is the upper phase. This phase is separated from the organic phase. The ammonium perrhenate solution can now be processed by standard methods to obtain pure crystalline ammonium perrhenate. The organic phase which is now essentially tributyl phosphate can be recycled in the above process.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for recovering rhenium from tungsten and rhenium bearing material, said process comprising:
   (a) reacting said tungsten and rhenium bearing material with a mixture of sodium hydroxide and an oxidizing reactant to form a fused solid containing soluble tungsten and rhenium values.
   (b) dissolving said fused solid in water to form an alkaline solution comprising tungsten and rhenium values,
   (c) contacting said solution comprising tungsten and rhenium values with a bed of a strongly basic anion exchange resin to absorb a major portion of the rhenium values and form a rhenium depleted solution comprising substantially all of the tungsten values,
   (d) contacting an organic stripping liquid comprising tributyl phosphate and hydrochloric acid with said anion exchange resin containing the rhenium values to form a liquid organic containing the rhenium values,
   (e) contacting water with said resin to form an aqueous solution of rhenium values,
   (f) mixing said liquid organic and aqueous solution to form a two phase system consisting of a first organic phase of tributylphosphate and the major portion of the rhenium values and an aqueous phase of hydrochloric acid, water, and the minor portion of the rhenium.
   (g) separating said organic phase from said aqueous phase, (h) removing the major portion of the hydrochloric acid from said aqueous phase to form a solution of perrhenic acid, (i) mixing said organic phase with aqueous ammonia to transfer essentially all of the rhenium values from said organic phase and to form another two phase system consisting of another organic phase another aqueous phase consisting of essentially all of the rhenium and, (l) separating said second aqueous phase from said second organic phase.

2. A process according to claim 1 wherein said tributylphosphate is recycled.

3. A process according to claim 1 wherein the hydrochloric acid is about 37% by weight.

4. A process according to claim 1 wherein said stripping solution is about 4.5 percent to about 35 percent by volume of hydrochloric acid and the balance is tributyl phosphate.

* * * * *